Nov. 25, 1952 — J. S. PAGE ET AL — 2,619,120
FLUID PRESSURE ACTUATED VALVE
Filed Feb. 5, 1951 — 2 SHEETS—SHEET 1
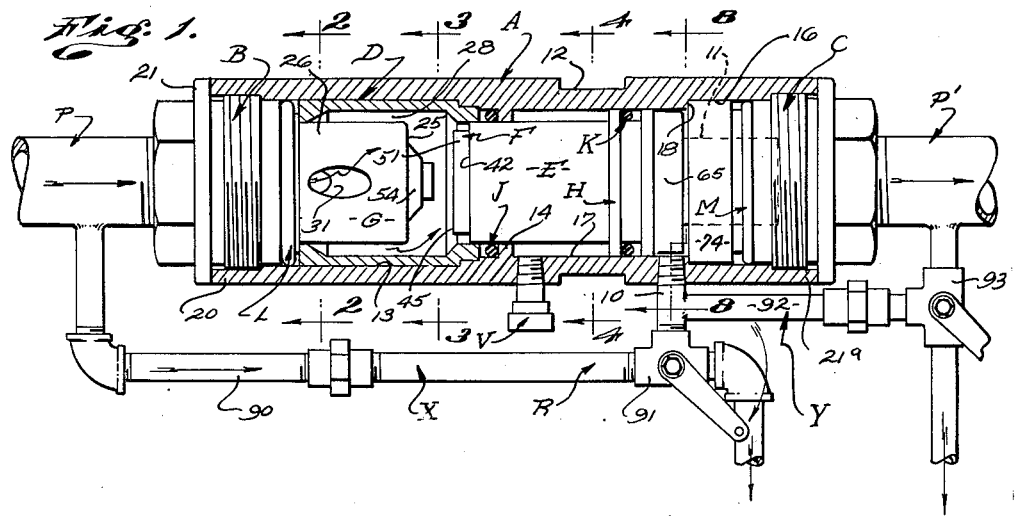
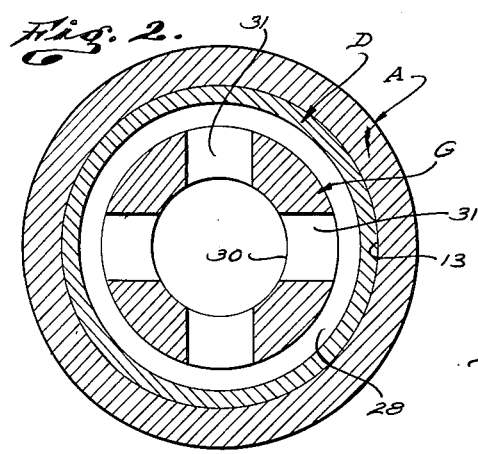
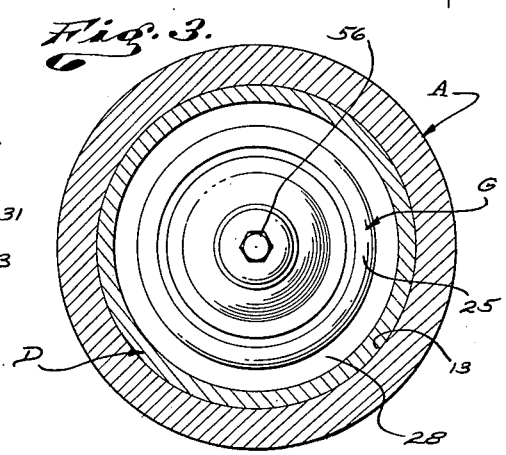
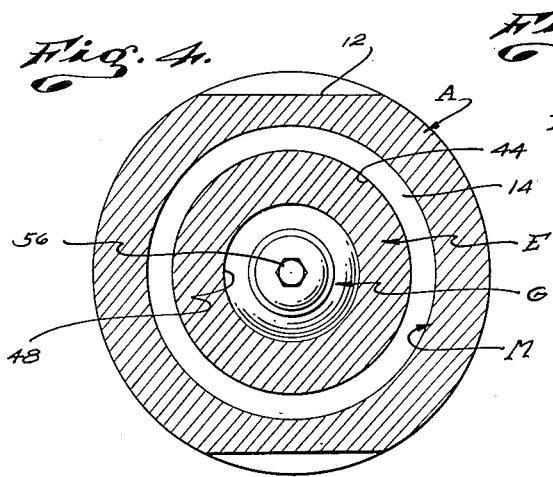
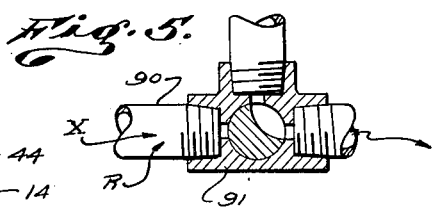
INVENTORS.
John S. Page
John S. Page Jr.
BY
Attorney

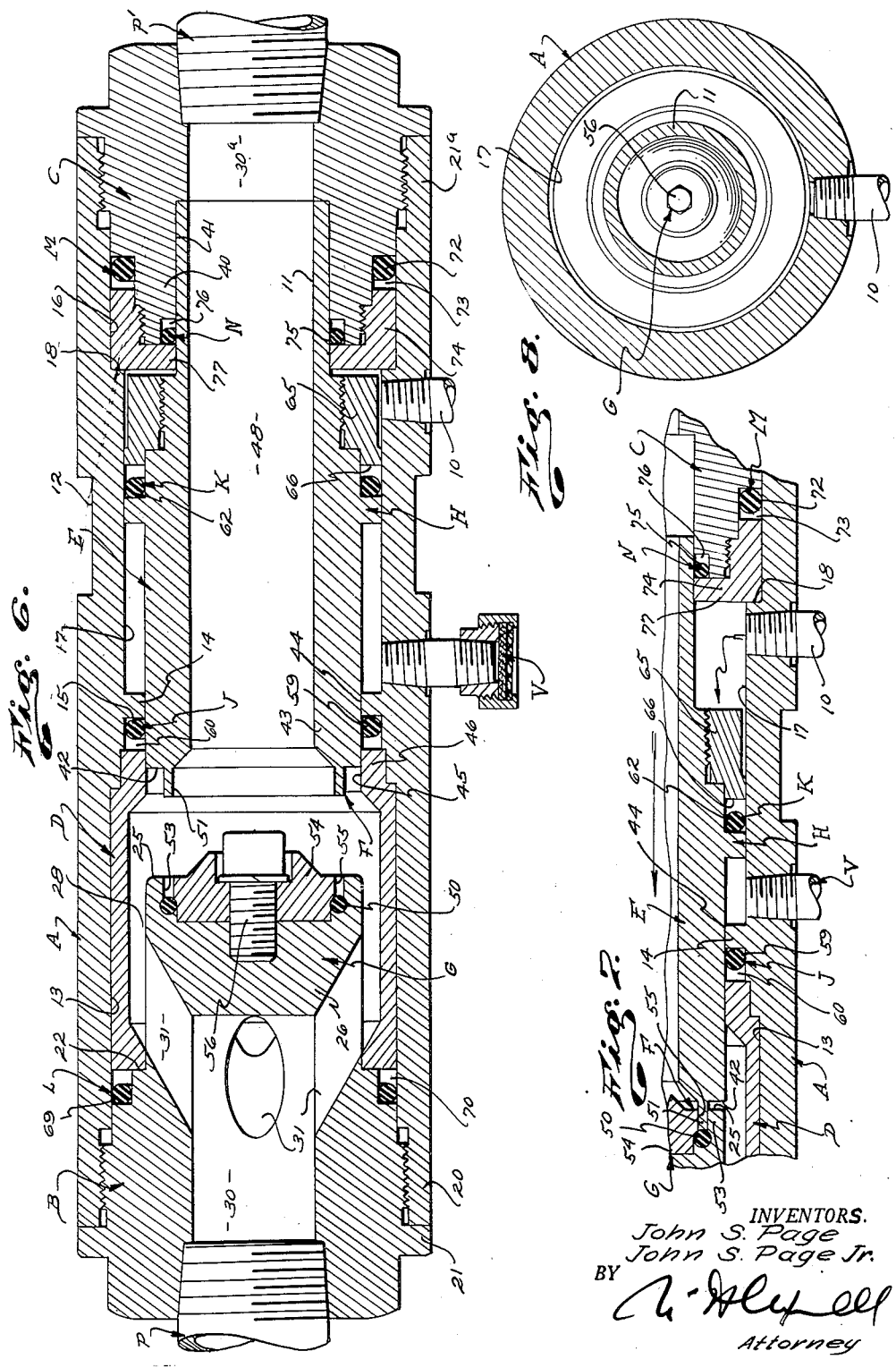

Patented Nov. 25, 1952

2,619,120

UNITED STATES PATENT OFFICE 2,619,120

FLUID PRESSURE ACTUATED VALVE

John S. Page and John S. Page, Jr.,
Long Beach, Calif.

Application February 5, 1951, Serial No. 209,392

17 Claims. (Cl. 137—653)

This invention has to do with a fluid pressure actuated valve and it is a general object of the invention to provide a simple, practical, improved valve construction that is simple and inexpensive of manufacture and which can be used to advantage in various situations.

A general object of the present invention is to provide a valve mechanism wherein the valve element proper reciprocates and is such as to be operated away from its seat by the fluid handled or controlled by the valve, regardless of the direction in which pressure is applied to the valve. With the construction provided by the present invention the valve, when closed, is held in that position by external fluid pressure derived either from the fluid being controlled or from any suitable source, and when that pressure is relieved the valve opens under the influence of the fluid that is controlled by the structure.

Another object of the present invention is to provide a valve mechanism of the general character referred to which is characterized by two units shiftable relative to each other, one of the units being a case preferably made up of sections, and the other being a valve proper which is within the case and is of simple tubular formation.

Another object of the invention is to provide a mechanism of the general character referred to in which sealing means in the form of annular sealing rings are incorporated at the points at which it is desired to hold pressure, the several rings employed in the structure being so mounted that they may be continuous annular rings having little or no flexibility, or formed of material which does not permit of the rings being sprung into place as is common with rubber rings, or the like.

Another object of this invention is to provide a valve structure of the general character referred to which is of simple, compact form, suitable for incorporation in a pipe line or the like between the ends of aligned pipe sections. With the structure provided by the invention the mechanism can be made of limited size and compact, so that it can be advantageously incorporated in situations where the usual valve is cumbersome and impractical.

It is another object of this invention to provide a valve mechanism of the general character referred to which is of simple, practical, inexpensive construction, the entire mechanism being characterized by round or tubular elements which are of such form and proportioning as to be strong and compact and which are such that they can be readily manufactured in quantities and at a minimum of cost.

The mechanism as provided by the present invention is characterized by a case which is sectional in construction, the case having a body portion which is tubular in form. A liner-receiving bore enters the body from one end and terminates at a flange occurring intermediate the ends of the body. A stepped bore enters the body from the other end and has an outer portion substantially larger in diameter than the inner portion, which inner portion serves as a cylinder. A seat closure is provided at one end of the body and is secured thereto, preferably by a threaded connection. The seat closure has a plug portion that enters the body and serves to retain a liner in the liner-receiving bore of the body so the liner is held tight against the flange occurring in the body. A seat is provided on the inner end of the plug portion of the closure and is spaced from the liner. The closure serves to pass fluid to or from the interior of the body and may have a central longitudinal opening in the plug portion communicating with lateral ports in the base of the seat portion. A head closure is provided at the other end of the body where it is secured, as by threads, and it has an inner end portion bored to form a valve guide. The head closure serves to pass fluid and may have a central passage through its plug portion communicating with the portion that forms the valve guide. In accordance with the invention the several elements thus far referred to are normally assembled into a rigid unit or assembly, and in typical installation pipe sections, or the like, are joined to the closure so that the assembly is rigidly joined or connected in alignment with the pipe sections. The valve of the structure operates in the body and has a forward end portion that opposes the seat and which is slidably guided in the flange of the body and also in a guide portion provided at the innermost end of the liner which occurs in the body. A piston portion is provided on the exterior of the valve and slides in the cylinder of the body while a reduced extension of the valve at the rearmost end thereof operates in the guide opening provided in the head closure. A sealing means is provided between the seat and the valve and preferably involves a seat ring of suitable sealing material located in the bottom of an annular groove which is of substantial depth and which is formed in the seat to oppose the valve. The end of the valve is provided with an annular rib which enters the said annular channel, and when the valve is closed the rib engages and seals with the sealing ring.

In accordance with the present invention the inside diameter of the annular rib of the sealing means is greater than that of the outside of the valve stem or extension, so that the valve will open under the influence of pressure introduced through the head closure, as well as under the influence of pressure introduced through the seat closure.

A sealing means is provided between the liner provided in the body and the forward end portion of the reciprocating valve. The sealing means is also provided between the valve and the cylinder wall or cylinder portion of the body. Another sealing means is provided between the closure and the body and a sealing means is provided between the head closure and the body. A sealing means is also provided between the head closure and the valve stem or extension. A feature of the present invention is the construction, arrangement and formation of parts which provides for each of the said sealing means being characterized by an annular ring of sealing material that can be arranged in place in the structure without being expanded or distorted any way, thus making it possible to employ sealing rings which are practical and effective for the handling of fluids that are ordinarily very difficult to handle.

The valve mechanism as above described is further provided with fluid connections whereby fluid from a suitable source or from a pipe line connected with the valve may be introduced to move the valve to a closed position and hold it in that position until it is desired to open the valve, which operation is effected by bleeding of pressure from the valve so that the pressure fluid handled by the valve causes it to open and this is regardless of the manner in which the valve is connected in a line, the valve being such that it can be reversed end for end without rendering it inoperative.

The various objects and features of our invention will be fully understood from the following detailed description of a typical preferred form and application of the invention, throughout which description reference is made to the accompanying drawings, in which:

Fig. 1 is a longitudinal view of a valve embodying the invention, certain of the parts being shown in section to illustrate details of construction, and the valve being shown in an open position. Fig. 2 is an enlarged transverse sectional view taken as indicated by line 2—2 on Fig. 1. Fig. 3 is an enlarged transverse sectional view taken as indicated by lines 3—3 on Fig. 1. Fig. 4 is an enlarged transverse sectional view taken as indicated by line 4—4 on Fig. 1. Fig. 5 is a view of the control valve that can be used with the structure of the present invention. Fig. 6 is an enlarged longitudinal detailed sectional view of the major portion of the mechanism shown in Fig. 1 of the drawings. Fig. 7 is a view of a portion of the structure shown in Fig. 6, showing the parts in a closed position, and Fig. 8 is an enlarged detailed transverse sectional view taken as indicated by line 8—8 on Fig. 1.

The structure embodying the present invention involves, generally, a case made up of a body A, a seat closure B, a head closure C and a liner D. A valve E operates in the body and a sealing means F operates between the valve and the seat G carried by closure B. A piston portion H provided on the valve operates in a cylinder opening in the body A and a fluid connection 10 is provided for the supply of operating fluid to the body so that it acts on the piston to move the valve to a closed position. A reduced extension 11 on the valve operates in the head closure C. A sealing means J is provided between the valve and the liner D. Sealing means K is provided between the valve and the body to prevent leakage past the piston H. A sealing means L is provided between the seal closure B and the body. A sealing means M is provided between the head closure C and the body and a sealing means N is provided between the head closure C and the valve extension 11. A suitable fluid supply means R is provided to supply operating fluid to the connection 10.

The body A is an elongated tubular part which may, in practice, be designed so that it is of limited size as to cross section, that is, so that it is not much larger than fittings such as are ordinarily employed in connection with pipes P and P' in connection with which the structure may be employed. Further, the body may, in practice, be formed and constructed so that it is substantially uniform in external configuration from one end to the other. It is ordinarily preferred to form the body so that its exterior is round in cross section, in which case suitable flat parts or lands 12 are provided to receive a wrench or the like.

A liner-receiving bore 13 enters the body A from one end, which we will term the forward end for the purpose of distinguishing it from the opposite end which we will refer to as the rear end.

The liner receiving bore 13 extends a substantial distance into the body and terminates at a flange 14 provided in the body. The flange projects radially inward at a point intermediate the ends of the body and has a side forming a shoulder 15 at which the bore 13 terminates.

A stepped bore enters the body from the other or rear end and it has an outer seal-receiving portion 16 somewhat larger in diameter than its inner portion 17 which is of substantial length and cylindrical in form to provide a cylinder in the body to accommodate piston H. A shoulder 18 occurs where the seal receiving bore 16 joins the cylinder opening 17.

The closure B provided at the forward end of the body A is referred to as a seat closure in that it carries or supports the seat G so that the seat occurs in the proper position within the body or within the liner D that is provided in the body. The closure B is releasably connected to the forward end portion of the body A as by a suitable threaded connection. In the particular case illustrated the body is provided with a forward end portion 20 into which the closure B is threaded so that it, in effect, plugs the end of the body. With the particular case illustrated a stop flange 21 on the closure seats against the extension 20 to determine the extent to which the closure can be threaded into the body.

The liner D is a simple tubular part slidably engaged in the liner-receiving opening 13 provided in body A so that it is clamped or held tight between the shoulder 15 and the inner end 22 of the closure B.

The seat G is carried by the closure B at the inner end thereof and projects from the closure into the liner D to terminate at a seat face 25 which is annular in form, concentric in the body A, and which opposes the forward end of the valve E. The base portion 26 of the seat is joined to or is integral with the closure B and in the prefered form of the invention the entire seat is smaller in diameter than the closure B and is smaller than the interior of the liner D so that an annular passage 28 occurs between the exterior of the seat and the interior of the liner.

In a preferred form of the invention the closure B is employed to pass fluid either to or from the interior of the body and in a preferred arrangement a central longitudinal flow handling passage 30 is provided through the closure B and is in communication with lateral ports 31 which connect with the passageway 28 as clearly shown throughout the drawings. In practice the closure B may be connected with a suitable pipe P, or the like, and any suitable form of connection can be provided between the pipe and the closure. We have shown the pipe P threaded into the outer end of the opening provided in the closure.

The head closure C is provided at the rear end of the body A and is secured thereto by a suitable releasable connection, say, for example, a threaded connection. In the case illustrated the construction at closure C is substantially the same as that at closure B, that is, the body has a rear end extension 21ª and the closure C is in the nature of a plug threaded into the extension 21ª. In the case illustrated the closure C is adapted to pass fluid and for this purpose has a central fluid passage 30ª and the pipe P' shown connected to closure C is shown threaded into the opening 30ª.

The inner end portion 40 of closure C is provided with a bore 41 of limited diameter forming a guide for the extension 11 of the valve E.

The valve E provided in the present structure is an elongate tubular element located centrally in the body A where it is confined between the closures B and C with a forward end 42 opposing the face 25 of seat G. The forward end portion 43 of the valve is slidably supported in a guide opening 44 formed by the flange 14 in the body A and also in an opening 45 provided in a guide portion 46 provided at the innermost end of the liner D.

The piston H occurs on the exterior of the valve E and is in the nature of an outwardly projecting flange-like part on the piston and preferably formed integral therewith. The piston H is preferably slidably engaged in the cylinder opening 17 provided in body A.

The valve extension 11 is provided at the rear end portion of the valve element E and is slidably engaged in the guide opening 41 provided in the closure C. The valve E being tubular has a passage 48 extending through it from one end to the other, which passage may be uniform in size and shape throughout its length and is preferably of the same size as the passage 30ª provided in the closure C.

The sealing means F serves to seal between the forward end portion of the valve E and the seat G and in accordance with the preferred form of the invention it involves an annular sealing ring 50 located at the bottom of a deep annular channel provided concentrically in the face 25 of the seat and an annular rib 51 of substantial extent radially of the structure projecting from the forward end 42 of the valve to enter the channel in the seat and engage and seal with the ring 50. In the preferred form of the invention the annunlar sealing ring 50 is round in cross-sectional configuration and the construction that we have provided is such that the ring can be confined in an enlargement at the bottom of the channel and yet be of such formation as to be substantially rigid or permanent as to form. In accordance with our construction we provide a socket opening in the seat G from the face end thereof to establish the outer wall 53 of the annular channel that carries the ring 50, and we provide an insert 54 in the socket with the periphery of the insert forming the inner wall 55 of the channel. The insert 54 is releasably secured to the portion of the seat in which the socket is formed, as by a screw fastener 56.

In accordance with the present invention the annular channel provided in the seat for reception of the rib 51 is of substantial depth, as shown throughout the drawings, and the channel and rib are related to fit so that as the valve closes fluid trapped in the channel by entrance of the rib into the channel escapes from the channel past the rib allowing the rib to finally engage the sealing ring 50. By suitably relating or proportioning the parts the action just referred to can be such as to suitably cushion or check the closing movement of the valve. In other words, the structure provides a movement retarding means or shock absorber that prevents hammering of the valve such as might otherwise occur.

The sealing means J provided between the liner D and the valve E involves an annular sealing ring 59 carried in a recess 60 provided at the innermost end of the liner where the guide portion 46 of the liner opposes the shoulder 15 of flange 14. With this construction the sealing ring 59 may be a continuous rigid member that can be engaged with the liner as the liner is assembled into the body so the ring is confined between the liner and the flange 14 of the body, with its inner periphery exposed to seal with the exterior of the valve member E.

The sealing means K provided between the piston and the body involves an annular sealing ring 62 engaged around the valve E at the rearmost side of the piston H where it is confined in working position by a retainer 65 applied to the valve. The retainer 65 is shown as an annular part or ring threaded onto the valve to have a shoulder 66 opposing and suitably spaced from the piston H. The sealing ring 62 is confined between the shoulder 66 and the piston H with its outer periphery exposed to have sealing engagement with the wall of the cylinder opening 17. With the construction just described the sealing ring 62 can be a continuous rigid ring of suitable sealing material engaged over the valve to adjoin the piston H prior to the retainer 65 being threaded onto the valve. The sealing means L occurs between the closure B and the body A and includes a continuous annular sealing ring 69 carried in a recess 70 provided at the inner end of the closure B opposing the outermost end of the liner D. The sealing ring 69 may be freely slid onto the closure B or into the recess 70 prior to the closure being applied to the body and when the closure B is in place in connection with the body the recess 70 is closed by the liner so the ring 69 is confined in operating position with its outer periphery in sealing engagement with the bore 13 of the body.

The sealing means M acts between the head closure C and the body A and may involve a continuous rigid annular sealing ring 72 carried in a recess 73 provided at the inner end portion of closure C while a retainer 74 carried on the inner end portion 40 of closure C confines the ring 72 to the recess 73 with the outer periphery of the ring 72 in sealing engagement with the portion 16 of the body. In the preferred construction the retainer 74 is in the nature of a ring threaded onto the portion 40 of closure C. Through this construction the ring 72 can be a rigid continuous annular part that can be positioned in the recess 73 prior to the retainer 74 being applied to the closure C.

The sealing means N occurs between the closure C and the valve extension 11. The means N includes a continuous annular rigid sealing ring 75 carried in a recess 76 provided at the inner end of closure portion 40 where a flange 77 of the retainer 74 confines the ring 75 in the recess 76 with the inner periphery of the ring in sealing engagement with the exterior of the valve extension 11. The ring 75 like the other sealing rings of the structure can be arranged in place to be confined as the parts are assembled.

In accordance with the present invention the inside diameter of the rib 51 of means K is greater than the outside diameter of the valve extension 11 and as a result of this relationship of parts the valve E will be moved from the closed position by fluid pressure introduced through pipe P' when the cylinder of the body is vented through connection 10. When the structure is used so that pressure is introduced through pipe P the valve is opened by such pressure acting on the end 42 of the valve E.

The pressure supply means R supplies pressure to the structure to effect movement of the valve to the closed position and may be employed to hold the valve closed. The portion of the body cylinder 17 between flange 14 and piston H is maintained open to atmosphere through a suitable vent V and the operating fluid or pressure is introduced into the structure through the connection 10 to act between closure C and the piston H. So far as the broader aspects of the present invention are concerned operating pressure required to close the valve against forces tending to open it may be derived from any suitable source and may be introduced through the connection 10 under control of suitable valves or the like. In Fig. 1 of the drawings we have shown a pressure connection X from pipe P to connection 10 and a pressure connection Y from pipe P' to connection 10, either one or both of which can be incorporated in the structure as circumstances require.

The connection X involves a pressure supply line 90 extending from pipe P to connection 10 and a control valve 91 in the line 90 of such construction that it can be operated between several different positions, for instance, a closed position, a position passing fluid from pipe P to connection 10, or a position stopping flow from pipe P and allowing exhaust to occur from the connection 10.

The connection Y may be substantially the same as that just described except that it provides a pressure supply line 92 of the pipe P' to the connection 10 under control of a valve 93 which may correspond in construction and operation to valve 91, above described.

From the foregoing description it will be apparent that if the structure is to be employed to control pressure from pipe P only, the connection X is all that is required. In this case the line pressure from pipe P will open the valve E and line pressure admitted through the connections X and 10 will close the valve and hold it in that position until pressure is exhausted through operation of valve 91.

If it is desired to employ the structure so that pressure is supplied through pipe P' then connection Y can be used. Should the structure be required in a situation where the direction of flow or of pressure control varies at different times, then both the connections X and Y are employed and the desired action of the structure is gained by suitable operation of valves 91 and 93.

From the foregoing description it is important to observe that the line pressure handled by the structure, whether it be from pipe P or from pipe P', serves to open the valve and consequently the valve is, in effect, such that it can be installed in a pipe line without the exercise of great care as to its proper orientation. Furthermore, it is important to observe that the various parts of the structure are, in effect, round or turned parts, such as can be readily manufactured from tubular stock, and in a manner to be of maximum strength, and thus assure a compact, practical, inexpensive structure.

An important feature of the present invention is the provision of ring type seals throughout the structure where seals are required, and in each instance in the structure where a seal is provided an annular sealing ring is utilized, and such ring can be a continuous rigid ring or one incapable of being expanded or distorted into position as is common when annular O-type packing rings are employed. This feature of the invention is highly important in situations where fluids are being handled at very low temperatures, as it has been determined that rigid or hard packing materials are required under such circumstances, and with ordinary constructions such hard sealing rings cannot be satisfactorily arranged in place or removed. With our construction each and every one of the seals involved can be easily installed and can be renewed or replaced easily and quickly if circumstances so require.

Having described only a typical preferred form and application of our invention, we do not wish to be limited or restricted to the specific details herein set forth, but wish to reserve to ourselves any variations or modifications that may appear to those skilled in the art and fall within the scope of the following claims:

Having described our invention, we claim:

1. A fluid handling structure including, an elongate body with its ends adapted to be connected with fluid handling ducts and with a cylinder portion intermediate its ends, an inwardly facing seat at one end of the body, a guideway in the body at the other end thereof, a tubular valve slidable in the body with an end adapted to cooperatively engage the seat and with an extension slidably carried in the guideway, and a piston on the valve and slidably engaged in the cylinder portion, the valve closing the body against flow therethrough when engaged with the seat, the cross sectional area of the valve extension being less than that of said end of the valve whereby fluid under pressure from either end of the body tends to move the valve in the body to a position where the said end of the valve is spaced from the seat.

2. A fluid handling structure including, an elongate tubular body with a cylinder portion intermediate its ends, a closure at one end of the body adapted to connect with a fluid handling duct and to pass fluid, a seat in the body and carried by said closure, a second closure at the other end of the body adapted to connect with a fluid handling duct and to pass fluid and having a guide bore at its inner end, a tubular valve in the body with an end opposing and adapted to cooperatively engage the seat and an extension slidable in said bore, a piston on the valve operating in the cylinder portion, and sealing means between the end of the valve and the seat including a sealing ring at the bottom of an annular channel in the seat and an annular rib on said end of the valve engageable in the channel to contact the ring, the valve closing the body against the passage of fluid when engaged with the seat.

3. A fluid handling structure including, an elongate tubular body with a cylinder portion intermediate its ends, a closure at one end of the body adapted to connect with a fluid handling duct and to pass fluid, a seat in the body and carried by said closure, a second closure at the other end of the body adapted to connect with a fluid handling duct and to pass fluid and having a guide bore at its inner end, a tubular valve slidable in the body with an end opposing and adapted to cooperatively engage the seat to close the body against the passage of fluid, the valve having an extension slidable in said bore, a piston on the valve operating in the cylinder portion, and sealing means between the end of the valve and the seat including a sealing ring at the bottom of an annular channel in the seat and an annular rib on said end of the valve engageable in the channel to contact the ring, the inside diameter of the rib being greater than the diameter of said bore.

4. A fluid handling structure including, an elongate tubular body with a cylinder portion intermediate its ends, a closure at one end of the body adapted to connect with a fluid handling duct and to pass fluid, a seat in the body and carried by said closure, a second closure at the other end of the body adapted to connect with a fluid handling duct and to pass fluid, a tubular valve slidable in the body between the closures and adapted to stop flow of fluid through the body, a piston on the valve operatively engaged in the cylinder portion, and sealing means between the valve and seat including, a sealing ring in an annular channel in the seat and an annular rib projecting from the valve and entering the channel with clearance to engage said ring.

5. A fluid handling structure including, a body having ends adapted to be connected with fluid handling ducts and having a cylinder portion immediate its ends, a seat in the body with an annular face, the seat having a socket entering it from said face and an insert in the socket defining an annular channel in said face, a tubular valve slidably carried in the cylinder portion of the body and having an end opposing and adapted to cooperatively engage said seat to stop flow of fluid through the body, and an annular rib on the said end of the valve engageable in the channel.

6. A fluid handling structure including, a body having ends adapted to be connected with fluid handling ducts and having a cylinder portion, a seat in the body with an annular face, the seat having a socket entering it from said face and an insert in the socket defining an annular channel in said face, a sealing ring in the channel, a tubular valve slidably carried in the cylinder portion of the body and having an end opposing and adapted to cooperate with said seat to stop flow of fluid through the body, and an annular rib on the said end of the valve engageable in the channel to seal with the ring.

7. A fluid handling structure including, an elongate body having ends adapted to be connected with fluid handling ducts and with a cylinder portion intermediate its ends, an inwardly facing seat at one end of the body, a liner stationary in the body and surrounding and spaced from the seat, a guideway at the other end of the body, a tubular valve slidable longitudinally in the body with an end adapted to cooperatively engage with the seat to stop flow of fluid through the body, the valve having an extension carried in the guideway, and a piston on the valve and engaged in the cylinder portion, the cross-sectional area of the extension being less than that of said end of the valve whereby fluid under pressure from either end of the body tends to move to the valve in the body to a position where the said end of the valve is spaced from the seat.

8. A fluid handling structure including, an elongate tubular body intermediate its ends with a cylinder portion, a closure at one end of the body adapted to connect with a fluid handling duct and to pass fluid, a seat in the body and carried by said closure, a liner stationary in the body retained therein by said closure and surrounding and spaced from the seat, a second closure at the other end of the body adapted to connect with a fluid handling duct to pass fluid and having a guide bore at its inner end, a tubular valve in the body with an end opposing and engageable with the seat to stop flow through the body, the valve having an extension slidable in said bore, a piston on the valve operating in the cylinder portion, and sealing means between the end of the valve and the seat including a sealing ring at the bottom of an annular channel in the seat and an annular rib on said end of the valve engageable in the channel to contact the ring.

9. A fluid handling structure including, an elongate tubular body with a cylinder portion therein, a flow conducting closure at one end of the body, a seat in the body carried by said closure, a second flow conducting closure at the other end of the body and having a guide bore therein, a tubular valve in the body with an end opposing the seat and engageable therewith to stop flow through the body, the valve having an extension slidable in said bore, a piston on the valve and engaged in the cylinder portion, flow handling pipes connected to the closures, and means operating to conduct fluid from one of the pipes to the interior of the body between the piston and the second closure, the said bore being smaller in diameter than said end of the valve.

10. A fluid handling structure including, an elongate tubular body with a cylinder portion therein, a flow conducting closure at one end of the body, a seat in the body carried by said closure, a second flow conducting closure at the other end of the body and having a guide bore therein, a tubular valve in the body with an end opposing the seat and engageable therewith to stop flow through the body, the valve having an extension slidable in said bore, a piston on the valve and engaged in the cylinder portion, flow handling pipes connected to the closures, and means selectively supplying fluid under pressure from one or the other of the pipes to the interior of the body between the piston and the second closure.

11. A fluid handling structure including, an elongate tubular body with a cylinder portion therein, a flow conducting closure at one end of the body and adapted to connect with a fluid handling duct, a seat in the body carried by said closure, said closure having a central fluid passage communicating with lateral ports opening into the body, a second flow conducting closure at the other end of the body adapted to connect with a fluid handling duct and having a guide bore therein, a tubular valve in the body with an end opposing the seat and engageable therewith to stop flow through the body, the valve having an extension slidable in said bore, and a piston on the valve operating in the cylinder portion.

12. A fluid handling structure including, a body having a cylinder portion, a seat in the body, a tubular valve shiftable longitudinally in the body and cooperating with the seat to stop flow through the body, a piston in the valve operating in the cylinder portion, and sealing means between the valve and cylinder portion including, a substantially rigid sealing ring round in cross section and engaged around the valve against the piston and in engagement with the cylinder portion, and a retainer detachably carried by the valve confining the ring in operating position.

13. A fluid handling structure including, a body having a cylinder portion and an inwardly projecting flange at one end of said portion, a seat in the body, a tubular valve in the body cooperating with the seat to stop flow through the body, a piston on the valve operating in the cylinder portion, and sealing means between the valve and body including, a substantially rigid sealing ring in the body adjacent the flange and engaging the exterior of the valve, and a member releasably retained in the body and confining the ring to operating position.

14. A fluid handling structure including, a body having a cylinder portion and an inwardly projecting flange at one end of said portion, a seat in the body, a tubular valve in the body cooperating with the seat to stop flow through the body, a piston on the valve operating in the cylinder portion, and sealing means between the valve and body including, a substantially rigid sealing ring in the body adjacent the flange and engaging the exterior of the valve, and a liner in the body surrounding the seat and releasably held in position where it retains the ring in operating position.

15. A fluid handling structure including, an elongate body with a cylinder portion and open at one end, a closure in said end of the body carrying a seat within the body, a tubular valve slidable in the body and carrying a piston operating in the cylinder and having an end cooperating with said seat to stop flow through the body, and sealing means between the body and closure including, an element in the body, and a sealing ring carried in a recess entering the closure from its inner end, the said end of the closure being related to the said element so the ring is retained in the recess by said element and has sealing engagement with the body.

16. A fluid handling structure including, an elongate body with a cylinder portion and open at one end, a closure in said end of the body adapted to connect with a fluid handling duct, a tubular valve operating in the body and adapted to stop flow of fluid therethrough, and sealing means between the closure and body including a sealing ring surrounding the closure and sealing with the body and a retainer detachably connected to the closure and confining the ring to the closure.

17. A fluid handling structure including, an elongate body with a cylinder portion and open at one end, a closure in said end of the body adapted to connect with a fluid handling duct, a tubular valve in the body and adapted to stop flow of fluid therethrough and carrying a piston operating in the cylinder portion and having an extension slidably engaged with the closure, and sealing means between the closure and the body and between the closure and said extension including, a sealing ring around the closure and engaging the body, a sealing ring in the closure and engaging the extension, and a single retainer threaded to the closure and holding said rings in operating position.

JOHN S. PAGE.
JOHN S. PAGE, Jr.

REFERENCES CITED

The following references are of record in the file of this patent:

UNITED STATES PATENTS

| Number | Name | Date |
|---|---|---|
| 1,734,733 | Kruse | Nov. 5, 1929 |
| 1,956,010 | Diescher | Apr. 24, 1934 |
| 2,196,664 | Kofahl | Apr. 9, 1940 |